United States Patent
Hein et al.

(10) Patent No.: US 9,153,048 B2
(45) Date of Patent: Oct. 6, 2015

(54) SYSTEM OPTICS IN AT LEAST IN ONE OF BACKPROJECTION AND FORWARD PROJECTION FOR MODEL-BASED ITERATIVE RECONSTRUCTION

(71) Applicants: KABUSHIKI KAISHA TOSHIBA, Tokyo (JP); TOSHIBA MEDICAL SYSTEMS CORPORATION, Otawara-shi, Tochigi-ken (JP)

(72) Inventors: Ilmar A. Hein, Chicago, IL (US); Alexander Zamyatin, Hawthorn Woods, IL (US)

(73) Assignees: KABUSHIKI KAISHA TOSHIBA, Tokyo (JP); TOSHIBA MEDICAL SYSTEMS CORPORATION, Otawara-Shi (JP)

( * ) Notice: Subject to any disclaimer, the term of this patent is extended or adjusted under 35 U.S.C. 154(b) by 319 days.

(21) Appl. No.: 13/756,082

(22) Filed: Jan. 31, 2013

(65) Prior Publication Data

US 2014/0212018 A1  Jul. 31, 2014

(51) Int. Cl.
*G06K 9/00*  (2006.01)
*G06T 11/00*  (2006.01)

(52) U.S. Cl.
CPC ................................ *G06T 11/008* (2013.01)

(58) Field of Classification Search
None
See application file for complete search history.

(56) References Cited

U.S. PATENT DOCUMENTS

| | | | |
|---|---|---|---|
| 7,227,982 B2 | 6/2007 | De Man et al. | |
| 8,116,426 B2 | 2/2012 | Hein et al. | |
| 8,416,914 B2 * | 4/2013 | Thibault et al. | 378/4 |
| 8,731,266 B2 * | 5/2014 | Zeng et al. | 382/131 |
| 8,761,478 B2 * | 6/2014 | Hsieh et al. | 382/131 |
| 8,923,583 B2 * | 12/2014 | Thibault et al. | 382/128 |
| 2005/0286749 A1 | 12/2005 | De Man et al. | |
| 2009/0190814 A1 * | 7/2009 | Bouman et al. | 382/131 |
| 2011/0142315 A1 * | 6/2011 | Hsieh et al. | 382/131 |
| 2011/0150305 A1 * | 6/2011 | Zeng et al. | 382/131 |
| 2012/0114212 A1 * | 5/2012 | King et al. | 382/131 |
| 2012/0155728 A1 * | 6/2012 | DeMan et al. | 382/131 |
| 2012/0308099 A1 * | 12/2012 | Benson et al. | 382/131 |
| 2013/0010917 A1 * | 1/2013 | Thibault et al. | 378/4 |
| 2013/0343624 A1 * | 12/2013 | Thibault et al. | 382/131 |

OTHER PUBLICATIONS

Beister et al. "Iterative reconstruction methods in X-ray CT," 2012, Elsevier, Physica Medica, 28, 94-108.*

Ilmar A. Hein and Alexander Zamyatin, "System Optics in both Backprojection and Forward Projection for Model-based Iterative Reconstruction", Medical Imaging 2012: Physics of Medical Imaging, Mar. 3, 2012, pp. 83133L1-83133L8, vol. 8313, SPIE, California, USA.

B. De Man and S. Basu, "Distance-driven projection and backprojection", Nuclear Science Symposium Conference Record, Nov. 2002, p. 1477-1480, vol. 3, IEEE, New York, USA.

(Continued)

*Primary Examiner* — Jason Heidemann
(74) *Attorney, Agent, or Firm* — Yoshida & Associates, LLC (57) ABSTRACT

Iterative reconstruction (IR) algorithms are advantageous over standard filtered backprojection (FBP) algorithms by improving resolution and noise performance. In this regard, model-based IR algorithms (MBIR) have been developed to incorporate accurate system models into IR and result in a better image quality than IR algorithms without a system model. System optics are included in both forward and backprojection (IR¬SOM-FPBP).

18 Claims, 10 Drawing Sheets

(56) References Cited

OTHER PUBLICATIONS

Adam Wunderlich and Frederic Noo, "Exact and Efficient Computation of Noise Covariance for Fan-beam FBP Reconstructions That Use Rebinning to Parallel-Beam Geometry", Medical Imaging 2012: Physics of Medical Imaging, 2012, pp. 831323-1-831323-9, vol. 8313, SPIE, California, USA.

Yong Long, Jeffrey A. Fessler and James M. Balter, "3D Forward and Back-Projection for X-Ray CT Using Separable Footprints", IEEE Transactions on Medical Imaging, Nov. 2010, p. 1839-1850, vol. 29, Issue No. 11, IEEE, New York, USA.

Ge Wang and Ming Jiang, "Ordered-subset simultaneous algebraic reconstruction techniques (OS-SART)", Journal of X-Ray Science and Technology, Oct. 2004, p. 169-177, vol. 12, Issue No. 3, IOS Press, Amsterdam, Netherlands.

Jiang Hsieh, et al., "Recent Advances in CT Image Reconstruction", Current Radiology Reports, Jan. 16, 2013, p. 39-51, vol. 1, Issue No. 1, Current Science Inc, Philadelphia, PA.

International Search Report and International Preliminary Report on Patentability corresponding to International Application No. PCT/JP2014/052115 mailed on Apr. 22, 2014.

De Man, Bruno and Basu, Samit, "Distance-driven projection and backprojection in three-dimensions", Phys. Med. Biol., 49 (2004), pp. 2463-2475.

* cited by examiner

SYSTEM OPTICS IN AT LEAST IN ONE OF BACKPROJECTION AND FORWARD PROJECTION FOR MODEL-BASED ITERATIVE RECONSTRUCTION

FIELD OF THE INVENTION

The current invention is generally related to system model-based iterative reconstruction, and more particularly related to the use of a system optics model both in backprojection and forward projection in a predetermined iterative reconstruction algorithm.

BACKGROUND OF THE INVENTION

Two important advantages of iterative reconstruction (IR) algorithms over standard filtered backprojection (FBP) are improved resolution and better noise performance. IR algorithms thereby allow the use of patient dose that is lower than previously required with the use of standard FBP.

IR algorithms are separated into two general categories. A first category includes system optics models, commonly referred to as model-based IR (MBIR) while a second category fails to include system optics models. MBIR algorithms theoretically further improve the performance of prior art IR algorithms since errors and statistics are substantially corrected. One source of the errors is originated from system optics. MBIR algorithms further include a system optics model (SOM) to some extent in prior art. Thus, it is desired to improve the use of SOM in MBIR to reconstruct a CT image with good resolution and noise performance from data acquired at a low dose level.

DETAILED DESCRIPTION OF THE PREFERRED EMBODIMENT(S)

Figure 1:
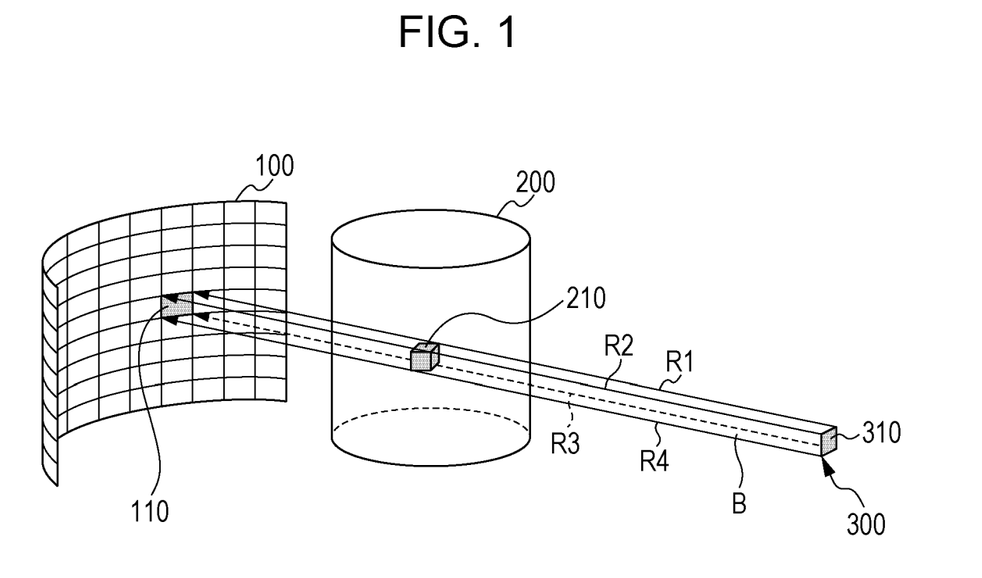
FIG. 1 is a diagram illustrating a full system optics model (SOM) which includes optics in both forward projection and backprojection (FPBP) in one embodiment according to the current invention.

Now referring to FIG. 1, a diagram illustrates a full system optics model (SOM) includes optics in both forward projection and backprojection (FPBP) in one embodiment according to the current invention. Although the diagram does not indicate, the above SOM-FPBP is used in combination with a predetermined iterative (IR) algorithm for reconstructing an image. In one embodiment of the system and the method according to the current invention, an image is reconstructed based upon a full system optics model (SOM) in both forward projection and backprojection (FPBP) using an iterative algorithm (IR) as optionally abbreviated as IR-SOM-FPBP in the current specification.

In the current specification, the term, optics system model (SOM) is a general term to include individual system optic models. The individual system optic models are generally categorized into four groups including 1) voxel model, 2) focal spot model, 3) detector element model and 4) rotational blur or view integration model in the current specification including the claims. The voxel model further includes specific techniques or methods using sub-voxels (microrays), blobs and splines. The focal spot model further includes specific techniques or methods using sub-sources (microrays), low-pass filters and separable foot prints. The detector element model further includes specific techniques or methods using sub-detectors (microrays) and separable foot prints. The rotational blur or view integration model further includes specific techniques or methods using sub-views (microrays) and low-pass filters. Models other the above mentioned specific techniques or methods are considered to be non-optics system models in the current specification including the claims. In other words, non-optics system models include specific techniques or methods such as single ray or distance driven. Although a distance driven method involves certain characteristics or aspects of system geometry, the distance driven method is not considered as a part of the system optic models in the current specification and the appended claims.

The diagram illustrates one embodiment of IR-SOM-FPBP according to the current invention. The embodiment includes a detector element model 110 in a detector array 100, an x-ray source model 310 in an x-ray source 300 and a single voxel model 210 in a predetermined voxel volume 200 that is conceptually located between the detector element model 110 and the x-ray source model 310.

Still referring to FIG. 1, micro rays are incorporated into the above described system optics models in the embodiment according to the current invention. In this regard, the system optics model is further specified as a microray-based system optics model. In the microray-based system optics model, the system optics is used to define a three-dimensional (3-D) x-ray beam. Furthermore, the microray-based system optics model takes into account a predetermined detector geometry, a predetermined voxel geometry and a predetermined source geometry to accurately define the 3-D x-ray beam. In this regard, the source model 310, the detector element model 110 and the voxel model 210 are sampled to create micro rays that "fill" the 3-D x-ray beam. For an illustrative purpose, a 3-D x-ray beam B contains a predetermined number of individual rays such as R1, R2, R3 and R4. When the 3-D x-ray beam B is filled with a sufficient number of rays, the 3-D x-ray beam more accurately samples objects within the beam than prior art distance driven methods to produce higher resolution images. In one embodiment according to the current invention, the 3-D x-ray beam is used in both the forward projection step and the backprojection step of a predetermined iterative reconstruction method. In general, the above described 3-D x-ray beam is applicable to any iterative reconstruction algorithm according to the current invention.

In the forward projection step, the x-Ray source model and the detector models are involved while in the backprojection step, the source model and the voxel models are involved. In one embodiment using the micro ray based system optics model, the detector element, the voxel and the source are conceptually subdivided into micro detector points, micro voxel points and micro source points, and the micro rays connecting these points are forward projected and backprojected.

In one embodiment of the current invention, SOM is included in both forward projection and backprojection. Optionally, SOM is included in backprojection alone in a second embodiment according to the current invention. The second embodiment achieves deconvolution of the source and provides better resolution than a prior art method where system optics is included only in forward projection. In general, resolution has been improved in IR with full system optics model in backprojection as well as forward projection with the OS-SART algorithm.

Figure 2A:
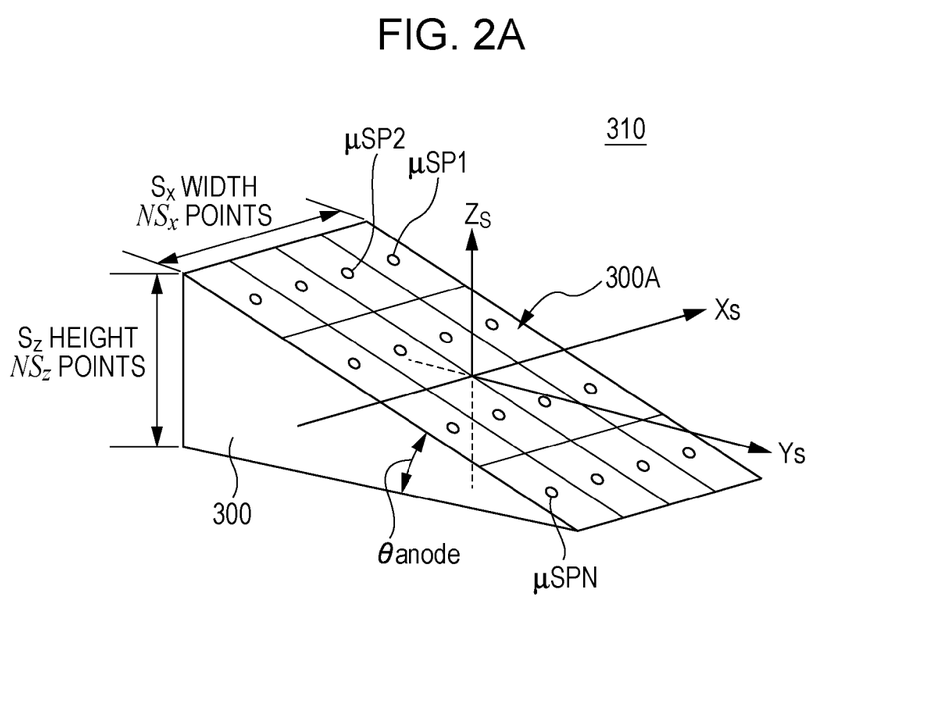
FIG. 2A is a diagram illustrating a source and its corresponding source model components in one embodiment according to the current invention.

Now referring to FIG. 2A, a diagram illustrates a source 300 and its corresponding source model components in one embodiment according to the current invention. In general, a source model 310 and the detector element models are incorporated into forward projection. The source geometry of the source 300 includes an anode angle $\theta_{anode}$, a source width SxWidth in the Xs direction and a source height SzHeight in the Zs direction. A surface 310A of the source 300 is sampled by $N_{\mu S}$ micro source points as located at a center of each of the grids in one embodiment according to the current invention. The grids in the embodiment are each equally defined according to a predetermined dimension along the Xs and Ys axes. The $N_{\mu S}$ micro source points are a collection of a predetermined number of discrete individual micro source points as labeled as μSP1, μSP2 through μSPN. In another embodiment according to the current invention, the $N_{\mu S}$ micro source points are optionally distributed in an arbitrary manner. In other words, the sampling pattern is not limited to a rectangular grid and includes any pattern such as a Gaussian distribution and a random pattern. In any case, each of the micro source points μSP1 through μSPN has an associated spatial source response weight SWu.

Figure 2B:
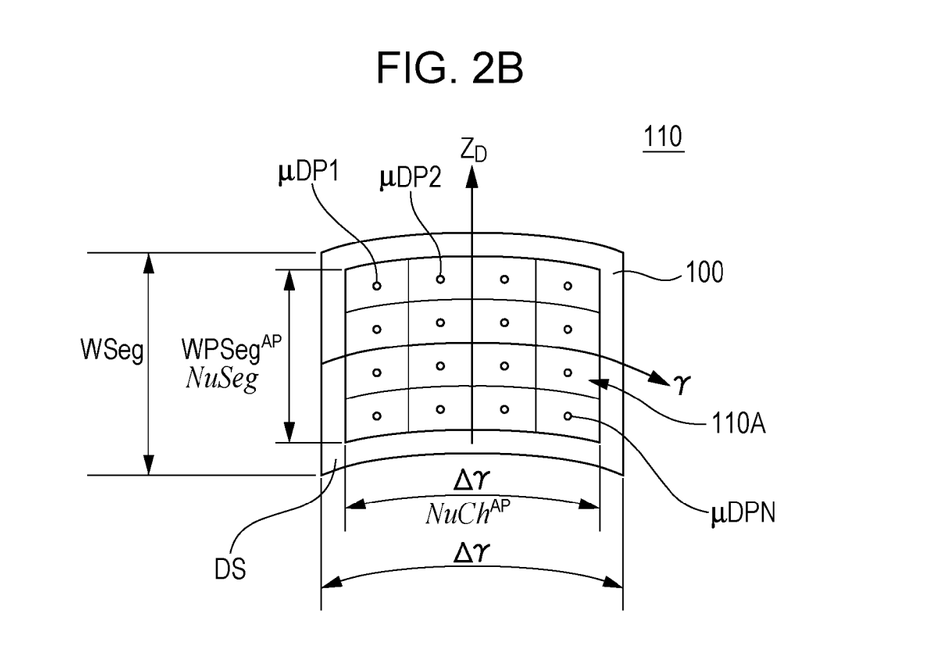
FIG. 2B is a diagram illustrating a detector and its corresponding detector model components in one embodiment according to the current invention.

Now referring to FIG. 2B, a diagram illustrates a detector 100 and its corresponding detector model components in one embodiment according to the current invention. In general, a detector model 110 and the source element models are incorporated into forward projection. The detector geometry of the curved detector 100 includes an angular channel width Δγ and a segment width Wseg. A surface 110A of the detector 100 is sampled by $N_{\mu D}$ micro detector points as located at a center of each of the grids in one embodiment according to the current invention. The grids in the embodiment are each equally defined according to a predetermined dimension along the γ and $Z_D$ axes. The $N_{\mu D}$ micro detector points are a collection of a predetermined number of discrete individual micro detector points as labeled as μDP1, μDP2 through μDPN. In another embodiment according to the current invention, the $N_{\mu D}$ micro detector points are optionally distributed in an arbitrary manner. In other words, the sampling pattern is not limited to a rectangular grid and includes any pattern such as a Gaussian distribution and a random pattern. In any case, each of the micro detector points μDP1 through μDPN has an associated spatial source response weight DWu.

Still referring to FIG. 2B, ach of the micro detector elements μDP1 through μDPN optionally includes dead space DS or pitch to account for inactive spaces between the individual micro detector elements. In the illustrated embodiment, the dead space DS is defined by a difference between the segment width Wseg and an active segment width $Wseg_{AP}$ along the $Z_D$ axis as well as a difference between the angular channel width Δγ and an active angular channel width $\Delta\gamma_{AP}$ along the γ axis. That is, inside the dead space DS is in fact an active aperture of the detector element as defined by the active segment width $Wseg_{AP}$ and the angular channel width $\Delta\gamma_{AP}$.

Figure 3:
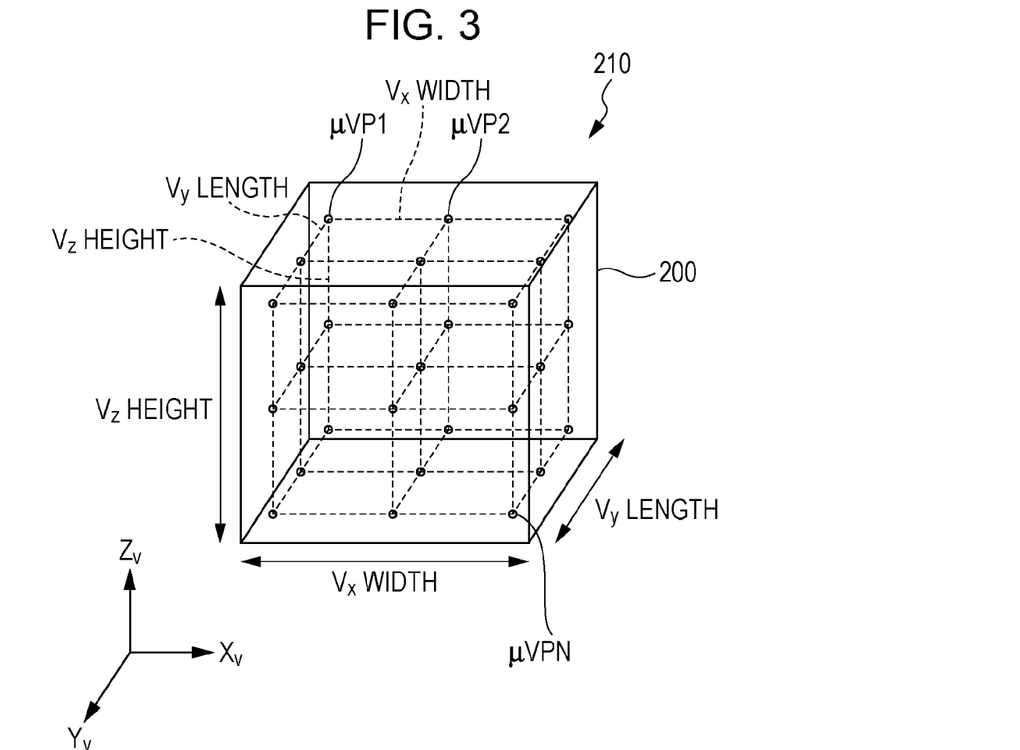
FIG. 3 is a diagram illustrating a voxel and its corresponding voxel model components in one embodiment according to the current invention.

Now referring to FIG. 3, a diagram illustrates a voxel 200 and its corresponding voxel model components in one embodiment according to the current invention. In general, a voxel model 210 and the source element model 310 are incorporated into backprojection. The voxel geometry of the voxel 200 includes a voxel width VxWidth in the Xv direction, a voxel length VyLength in the Yv direction and a voxel height VzHeight in the Zv direction. A voxel volume of the voxel 200 is sampled by $N_{\mu V}$ micro voxel points as located at intersections in one embodiment according to the current invention. The intersections in the embodiment are each equally defined according to a predetermined dimension along the Xv, Yz and Zv axes. The $N_{\mu V}$ micro voxel points are a collection of a predetermined number of discrete individual micro voxel points as labeled as μVP1, μVP2 through μVPN. In another embodiment according to the current invention, the $N_{\mu V}$ micro voxel points are optionally distributed in an arbitrary manner. In other words, the sampling pattern is not limited to a rectangular grid and includes any pattern such as a Gaussian distribution and a random pattern. In any case, each of the micro voxel points μVP1 through μVPN has an associated spatial source response weight VWui. Although the illustrated voxel geometry is cubic in one embodiment, other embodiments include the voxel geometry of different shapes or configurations.

Figure 4:
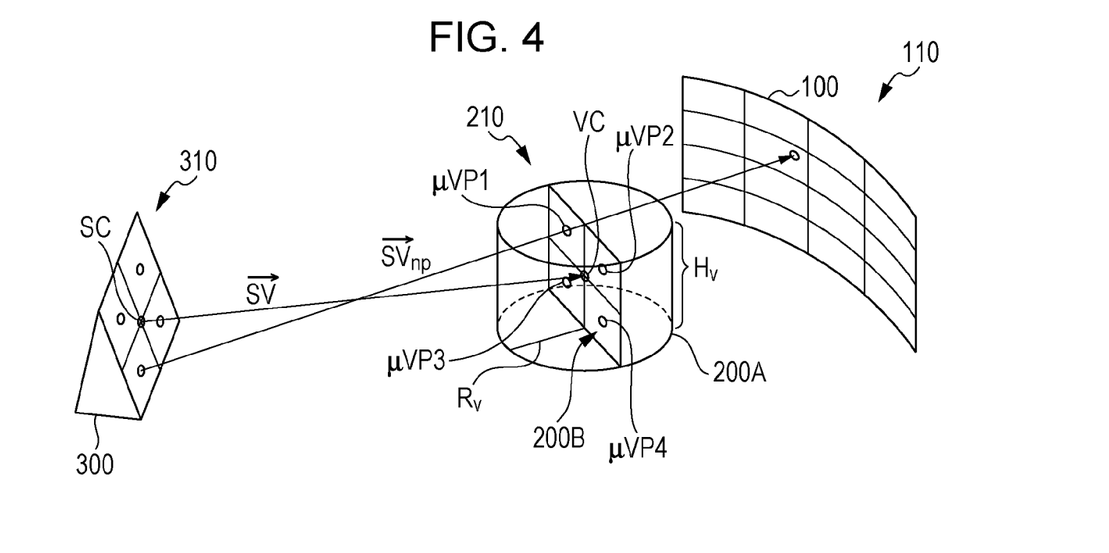
FIG. 4 is a diagram illustrating another embodiment of the voxel model and its voxel model components with respect to the full system optics model with both forward projection and backprojection (FPBP) according to the current invention.

Now referring to FIG. 4, a diagram illustrates another embodiment of the voxel model 210 and its voxel model components with respect to the full system optics model with both forward projection and backprojection (FPBP) according to the current invention. The full system optics model includes a source 300, a voxel 200A and a detector 100. The voxel 200A is divided into micro voxels with a total number of $N_{\mu v}$ micro voxel elements.

Still referring to FIG. 4, the voxel is not limited to a cube as illustrated in FIG. 3. Although the voxel shape was cubic and is sampled by a grid in one embodiment according to the current invention, the voxel is not limited to a particular shape. In fact, a 3-D cubic voxel as sampled by a predetermined grid is inefficient because there are duplications of microrays. Another embodiment of the voxel 200A as illustrated in FIG. 4 is cylindrical in shape with a rotating 2-D micro voxel plane 200B. The cylindrical voxel 200A has a radius Rv and a height Hv. The voxel 200A reduces a number of the micro voxels as illustrated to have four micro voxel points μVP1 through μVP4. The rotating 2-D micro voxel plane 200B rotates with a view angle and a voxel position and is always perpendicular to a source-voxel central ray $\vec{SV}$, which extends from a source center SC to a voxel center VC. The rotating 2-D micro voxel plane 200B thus reduces voxel sampling from 3-D to 2-D.

In the above described embodiments of the full system optics model with both forward projection and backprojection (FPBP) according to the current invention, each of the microrays within the beam is defined by a corresponding pair of a starting point and an ending point. The micro source points are the starting points for both forward projection and backprojection. On the other hand, the micro detector points are the ending points for forward projection while the micro voxel points are the ending points for backprojection. Furthermore, the microrays are optionally distributed in parallel in one embodiment and in a cone shape in another embodiment. In general, the cone distribution of the microrays must be used for backprojection to correctly sample the voxel. In contrast, either the cone distribution or the parallel distribution is optionally used for the microrays in forward projection.

Figure 5A:
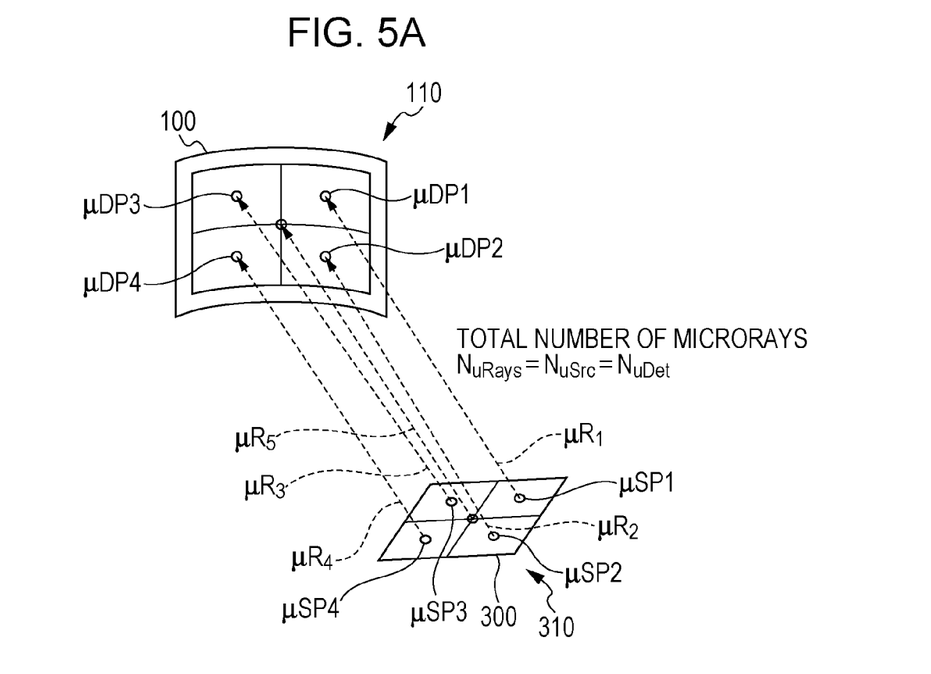
FIG. 5A is a diagram illustrating an exemplary parallel distribution of the microrays in one embodiment of the full system optics model with both forward projection and backprojection (FPBP) according to the current invention.

Now referring to FIG. 5A, a diagram illustrates an exemplary parallel distribution of the microrays in one embodiment of the full system optics model with both forward projection and backprojection (FPBP) according to the current invention. As illustrated in the diagram, the total number NuRays of microrays μR1 through μR4 is equal to the total number NuSrc of micro source points μSP1 through μSP4 as well as the total number NuDet of micro detector points μDP1 through μDP4. That is, there are one-to-one connections between the micro source points and the micro detector points as applied to forward projection.

Figure 5B:
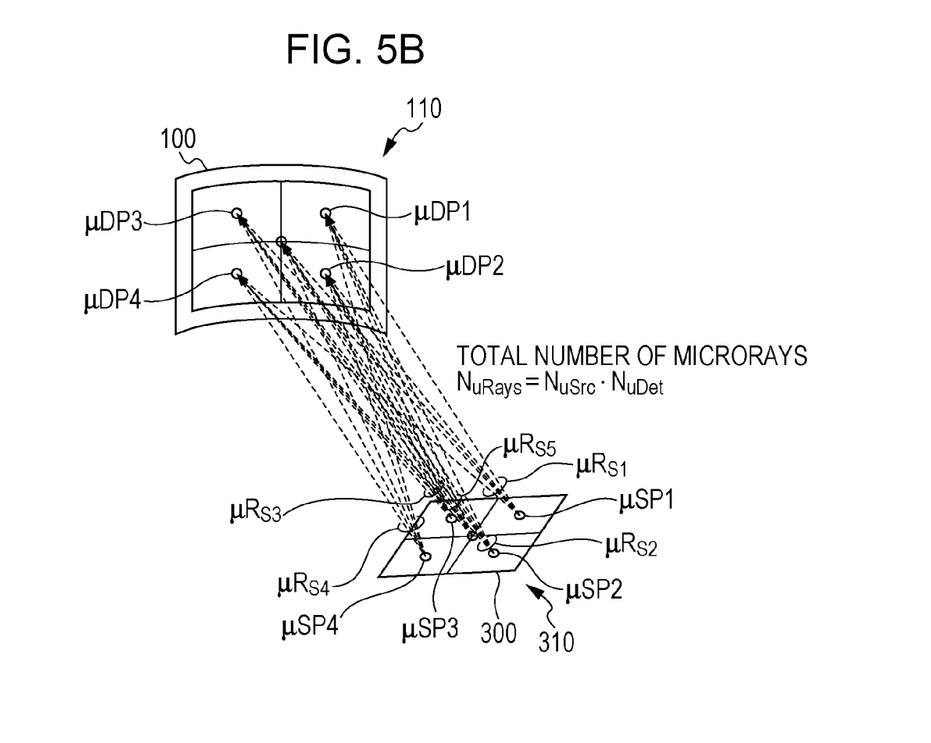
FIG. 5B is a diagram illustrating an exemplary cone distribution of the microrays in one embodiment of the optics system model according to the current invention.

Now referring to FIG. 5B, a diagram illustrates an exemplary cone distribution of the microrays in one embodiment of the optics system model according to the current invention. As illustrated in the diagram, the total number NuRays. of microrays μR1 through μRN is equal to a product of the total number NuSrc of micro source points μSP1 through μSP4 and the total number NuDet of micro detector points μDP1 through μDP4. That is, each of the micro source points is connected to all of the micro detector points as applied to back projection. For example, from the micro source point μSP1, microrays have to be distributed to all of the micro detector points μDP1 through μDP4 as seen in a ray bundle μRs1. Similarly, ray bundles μRs2 through μRs4 respectively distribute a group of four microrays from each of the micro source point μSP2 through μSP3 to all of the micro detector points μDP1 through μDP4. Furthermore, the total numbers of NuSrc and NuDet are different with each other in another embodiment.

In forward projection, each microray u in the beam is forward projected individually. In general, a final forward value for a detector element value is the mean of all NuRays forward projections in the beam. The beam distribution is optionally in parallel or cone. In this regard, ray tracing forward projection of a microray u is defined by Equation (1) with response weights:

$$FP'_u = \sum_{nu} SW_u \cdot VW_u \cdot DW_u \cdot L_{nu} \cdot V_{nu} \tag{1}$$

where $FP'_u$ is a final forward value for a detector element value, $SW_u$ is an associated spatial source response weight, $VW_u$ is an associated spatial voxel response weight, $DW_u$ is an associated spatial detector response weight, $L_{nu}$ is a path length of ray u through voxel nu and $V_{nu}$ is a voxel intersected by ray u. The final forward projection value for detector element ch,seg is the mean of the individual forward projections as defined by Equation (2):

$$FP_{ch,seg} = \frac{1}{N_{uRays}} \cdot \sum_{u=0}^{N_{uRays}-1} FP'_u \tag{2}$$

where $FP_{ch,seg}$ is a final forward projection value for a detector element as specified by a channel ch and a segment seg and $N_{uRays}$ is a total number of microrays. Alternate embodiments according to the current invention include any ray tracing algorithm such as Siddon for producing line integral values.

Figure 6:
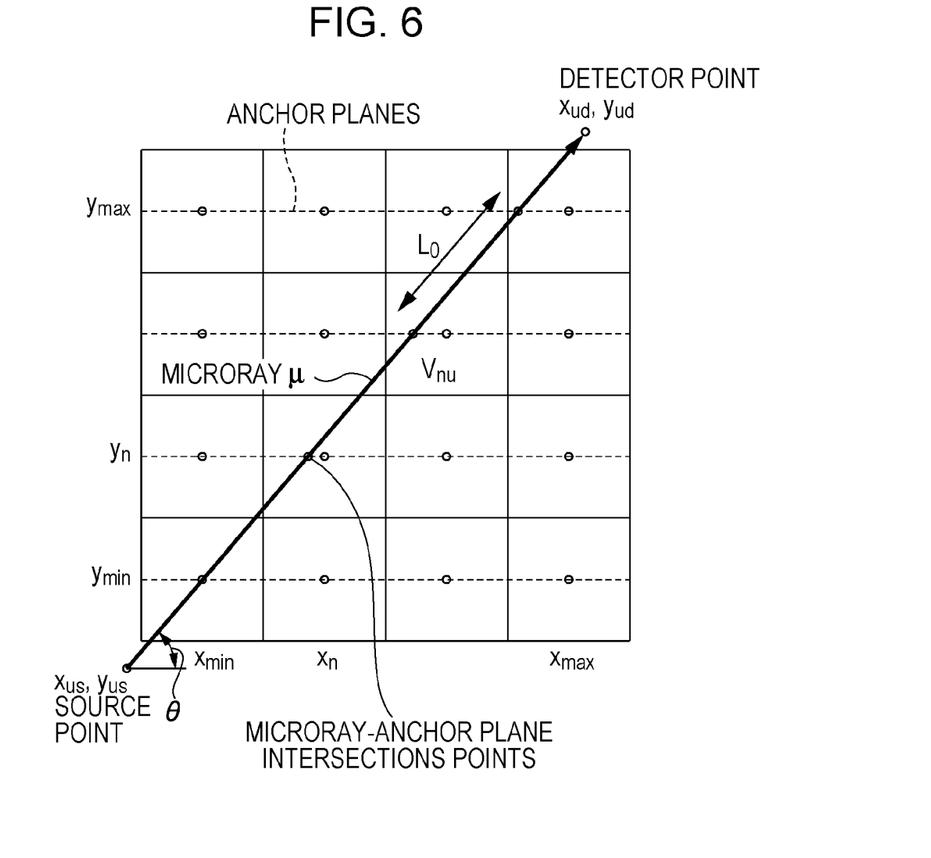
FIG. 6 is a graph depicting a scheme for efficient forward projection that is achieved with a 3-D nearest-neighbor ray tracing algorithm in one embodiment according to the current invention.

Now referring to FIG. 6, a graph depicts a scheme for efficient forward projection that is achieved with a 3-D nearest-neighbor ray tracing algorithm in one embodiment according to the current invention. According to the 3-D nearest-neighbor ray tracing algorithm, the transaxial plane is divided into quadrants. The image volume is upsampled by a factor of two prior to forward projection. Depending on the transaxial angle θ of a microray, either x or y planes are used as "anchor" planes to reduce the 3-D configuration to 2-D. For example, the graph shows that a given transaxial angle θ of a microray is between 45° and 135°. Since the given transaxial angle θ is 45°<θ≤135°, the nearest neighbor is anchored to y planes according to the following plane.

−45<q≤45 Use xmax ... xmin Anchor Planes

45<q≤135 Use ymin ... ymax Anchor Planes

135<q≤225 Use xmin ... xmax Anchor Planes

225<q≤315 Use ymin ... ymax Anchor Planes where xmin, xmax ymin, ymax are determined from entrance and exit points of the microray with the image volume. Consequently, the above equation (1) is optionally defined as Equation (3) using intersection length $L_θ$, which is a constant for a particular ray, and the line integral for microray u becomes:

$$FP'_{u,\theta} = L_\theta \cdot \sum_n SW_u \cdot VW_u \cdot DW_u \cdot V_{nu} \tag{3}$$

In another embodiment, ray tracing forward projection of a microray u is defined by Equation (4). For an arbitrary micro source point $x_{us}, y_{us}, z_{us}$ and an arbitrary micro detector point $x_{ud}, y_{ud}, z_{ud}$ with a corresponding transaxial angle φ, the transaxial intersection length Lφ of the microray u with a voxel is constant, and the forward projection for a microray from a micro source point us to a micro detector point ud through the image volume is:

$$FP'_{us,ud} = L_\varphi \cdot N \sum_n V_n \tag{4}$$

where n represents voxels intersected by the microray and N is the total number of voxels intersected by the microray. The overall forward projection value for detector element m is defined by Equation (5):

$$FP_m = \frac{1}{N_{us} \cdot N_{uD}} \cdot \sum_{NuS} \sum_{NuD} FP'_{us,ud} \tag{5}$$

where $N_{uS}$ is the total number of micro source points (NSx·NSz) while $N_{uD}$ is the total number of micro detector element points (NuCh·NuSeg). FIG. 2A illustrates that NSx and NSz are respectively a number of micro source elements along the x and z direction in the source model. FIG. 2B illustrates that NuCh and NuSeg are respectively a number of micro detector elements along the γ and z direction in the detector model.

Figure 7:
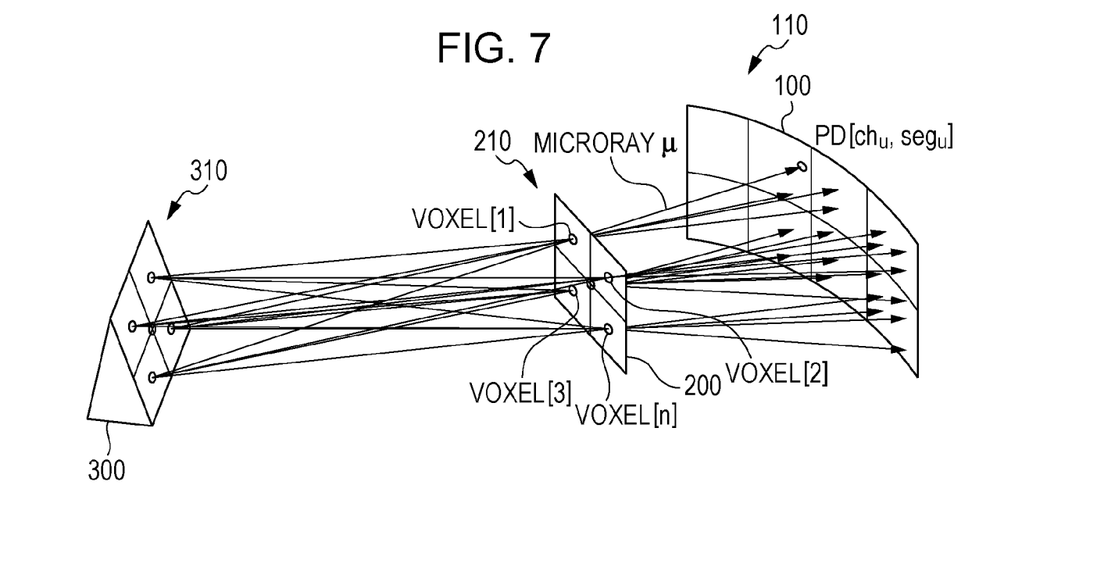
FIG. 7 is a diagram illustrating microrays with respect to the source and the voxel in backprojection in one embodiment of the current invention.

Now referring to FIG. 7, a diagram illustrates microrays with respect to the source and the voxel in backprojection in one embodiment of the current invention. For backprojection, the source model is the same as for forward projection, and the detector model is replaced by the voxel model. In backprojection, each microray u in the beam is individually backprojected. Similar to the source and detector models, the voxel is divided into a predetermined number of micro voxels or micro voxel points. Each of the micro voxel points voxel[1] thorough voxel[n] on the voxel model 210 receives an averaged $N_{uRays}$ microrays over the source 300 and the voxel 200. The detector 100 is now illustrated with projection data value $PD[ch_u, seg_u]$ at each of the micro detector points.

In general, an updated voxel value is the mean of all $N_{uRays}$ microray backprojections in the beam. The cone beam is used in backprojection. In this regard, ray tracing forward projection of a microray u is defined by Equation (6) with response weights:

$$Voxel[n] \mathrel{+}= \frac{1}{N_{uRays}} \cdot \sum_{u=0}^{N_{uRays}-1} SW_u \cdot VW_u \cdot DW_u \cdot PD[ch_u, seg_u] \quad (6)$$

where $ch_u$ and $seg_u$ are the channel and segment positions of microray u while $PD[ch_u, seg_u]$ is the projection data value for $ch_u, seg_u$. $SW_u$ is an associated spatial source response weight, $VW_u$ is an associated spatial voxel response weight, and $DW_u$ is an associated spatial detector response weight. In one embodiment, the nearest neighbor value is used, and bilinear interpolation is used in another embodiment.

For efficient backprojection, the voxel is modeled as a cylinder with radius $R_{Voxel}$ and height $H_{Voxel}$ and a 2D backprojection plane, having micro voxels or micro voxel points with a total of NuV positions as illustrated in FIG. 4. The plane 200B rotates with a view angle and a voxel position and is always perpendicular to the source center to voxel center ray. Backprojection is carried out as usual, except rather than backprojecting through a single ray from source center to voxel center, $N_{uS} \cdot N_{uV}$ microrays are backprojected and averaged over the source and the voxel as defined in Equation (7):

$$BP_n = \frac{1}{N_{us} \cdot N_{uV}} \cdot \sum_{NuS} \sum_{NuV} \sum_{M} a_{n,m} \cdot PD_m \quad (7)$$

where BP is the backprojected voxel n, m represents detector elements intersected by microrays in the beam, M is the total number of detector elements intersected by the beam, and $a_{n,m}$ is the backprojection operator.

Simulated projection data was generated with an exaggerated 6.0 mm source and 1.0 mm bead, to see if the bead diameter can be recovered in reconstruction with IR-SOM. Data was also generated with a practical 1.1 mm source and 0.2 mm bead to investigate resolution improvement under practical conditions.

Figure 8:
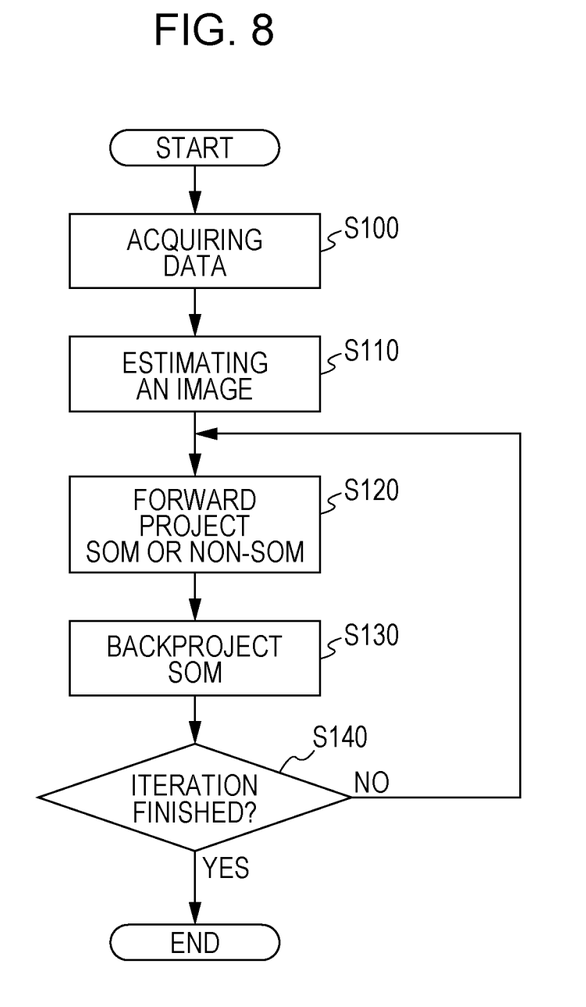
FIG. 8 is a flow chart illustrating steps or acts involved in one embodiment or process of reconstructing an image using a scanner according to the current invention.

Now referring to FIG. 8, a flow chart illustrates steps or acts involved in one embodiment or process of reconstructing an image using a scanner according to the current invention. In a step S100, data is acquired using a scanner using a predetermined modality such as a computer tomography (CT) apparatus. Using the acquired data, a seed image is estimated according to a predetermined algorithm in a step S110. From the estimated image, a predetermined iterative reconstruction algorithm such as ordered-subset simultaneous algebraic reconstruction technique (OS-SART) performs forward project the estimated image to generate projection data using a first predetermined one of system optics models and non-system optics models in a step S120. Subsequently, in a full system optics model reconstruction, the projection data is backprojected to update an image using a second predetermined one of the system optics models in a step S130. The above forward projection and backprojection in the steps S120 and S130 are iteratively applied until a predetermined condition is met. The condition is determined in a step S140. If the condition such as a predetermined number of iterations is met in the step S140, the process terminates itself. On the other hand, if the condition is not met in the step S140, the process terminates goes back to the step S120.

Iterative reconstruction with system optics model (IR-SOM) was incorporated into an ordered-subset simultaneous algebraic reconstruction technique (OS-SART) iterative reconstruction algorithm, with relaxation parameter λ=0.5. In one example, only fan beam was implemented, and only the transaxial xy resolution was investigated. Full 3D geometry was included in the fan beam simulations (i.e. the fan beam has thickness due to the source and detector and is not a simply a zero thickness 2-D plane).

Two simulations shown in the following results: Simulation (1) A 1.0 mm diameter bead with a 6.0 mm source and Simulation (2) a 0.2 mm diameter bead with a 1.1 mm source. Simulation (1) incorporates a source size much larger than the bead, to evaluate whether including system optics can compensate for source blurring and recover an object much smaller than the source. Simulation (2) represents a realistic focal spot size with a bead smaller than the detector size to evaluate the transaxial resolution.

Four reconstruction algorithms were used to reconstruct the bead: standard filtered backprojection with LAKS kernel (FBPJ), IR with full system optics as described above ("IR-SOM-FPBP), "pencil beam" IR with no system optics (IRP), and IR with system optics only in forward projection (IR-SOM-FP).

Table 1 summarizes the parameters used for the two simulations, for a standard fan-beam configuration.

TABLE 1

| | Simulation Parameters | | | | | |
| --- | --- | --- | --- | --- | --- | --- |
| | Focal Spot Size SxWidth (mm) | | | | | |
| | 1.1 | | | 6.0 | | |
| Parameter | IR-SOM-FPBP | IR-SOM-FP | IR-P | IR-SOM-FPBP | IR-SOM-FP | IR-P |
| NSx | 5 | 5 | 1 | 15 | 15 | 1 |
| NSz | 3 | 3 | 1 | 1 | 1 | 1 |

TABLE 1-continued

Simulation Parameters

| | Focal Spot Size SxWidth (mm) | | | | | |
|---|---|---|---|---|---|---|
| | 1.1 | | | 6.0 | | |
| Parameter | IR-SOM-FPBP | IR-SOM-FP | IR-P | IR-SOM-FPBP | IR-SOM-FP | IR-P |
| NuCh | 5 | 5 | 1 | 5 | 5 | 1 |
| NuV | 5 | 1 | 1 | 5 | 1 | 1 |
| Total microrays | 375 | 75 | 1 | 375 | 75 | 1 |
| Bead diameter (mm) | | 0.2 | | | 1.0 | |
| Bead position (x, y) mm | | (0.0, 10.0) | | | (0.0, 0.0) | |
| Recon FOV (mm) | | 5.0 | | | 20.0 | |
| Detector width (mm) | | | 0.575 | | | |
| Recon Matrix | | | 512 × 512 | | | |
| Anode Angle (degrees) | | | 11 | | | |
| Fan Angle (degrees) | | | 49.2 | | | |
| Detector Channels | | | 896 | | | |

Figure 9:
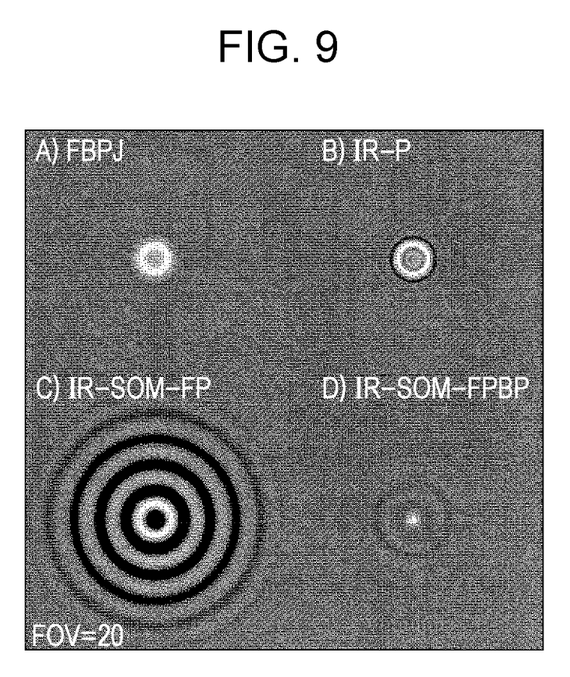
FIG. 9 are iteratively reconstructed images including the full system optics are shown for a comparison under predetermined conditions according to the current invention.

Now referring to FIG. 9, iteratively reconstructed images including the full system optics are shown for a comparison under predetermined conditions according to the current invention. The reconstructed images are of the 6.0 mm source and 1.0 mm bead. A combination of FBPJ and IR is used to reconstruct and normalize images. Clearly the three reconstructed images under the conditions of FBPJ, IR-P, and IR-SOM-FP only do not sufficiently sample the exaggerated source size and produce distorted images of the bead. Interestingly, the reconstructed image under the conditions of IR-SOM-FP only seems the most sensitive and produces the most distorted image. A method under the condition of IRSOM-FPBP reconstructs the bead accurately by fully recovering the size of the bead. The IR-SOM-FPBP images and plots do exhibit some small sidelobes, which may be due to a mismatch in forward and backprojection. The reconstructed image under the conditions of IR-SOM-FPBP has a substantially better resolution than reconstructed images under the conditions of the filtered backprojection (FBPJ), "pencil beam" IR with no system model (IR-P), and IR with system model only in forward projection.

Figure 10:
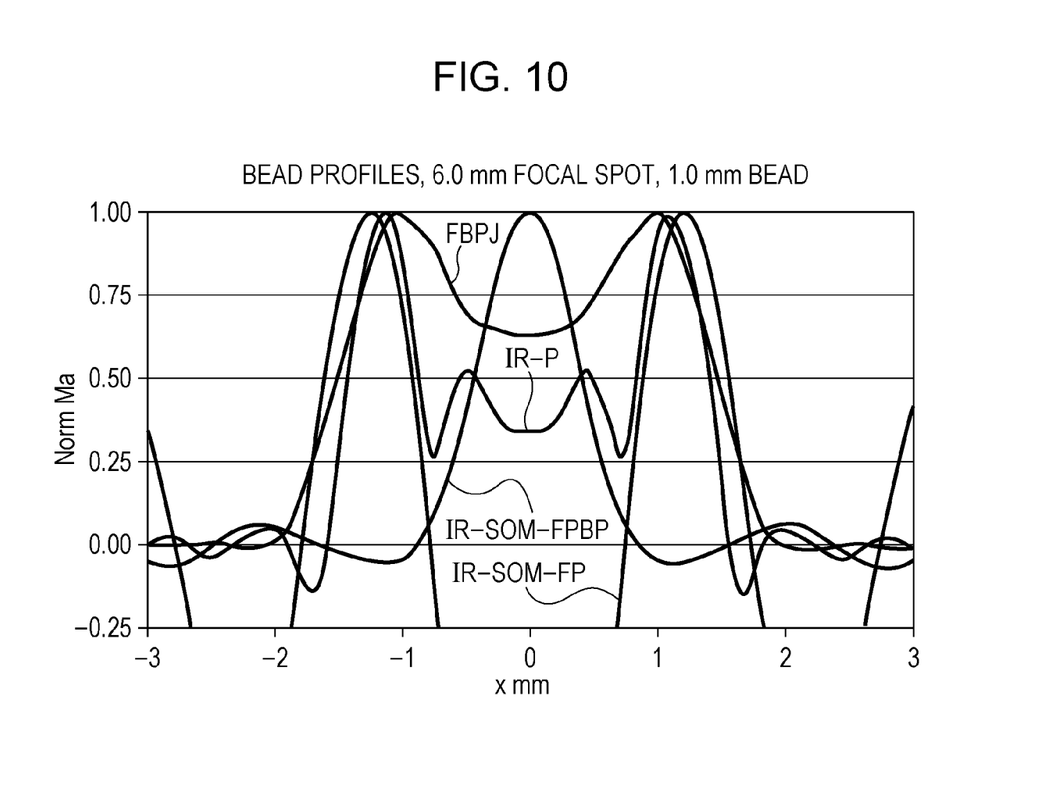
FIG. 10 is a graph illustrating 1-D profiles along x axis through the 1.0 mm bead after 4,000 iterations under the above described four conditions according to the current invention.

FIG. 10 is a graph illustrating 1-D profiles along x axis through the 1.0 mm bead after 4,000 iterations under the above described four conditions according to the current invention. As described above with respect to FIG. 9, the profile under the conditions of IR-SOM-FPBP has a substantially better resolution than reconstructed images under the conditions of the filtered backprojection (FBPJ), "pencil beam" IR with no system model (IR-P), and IR with system model only in forward projection.

Figure 11:
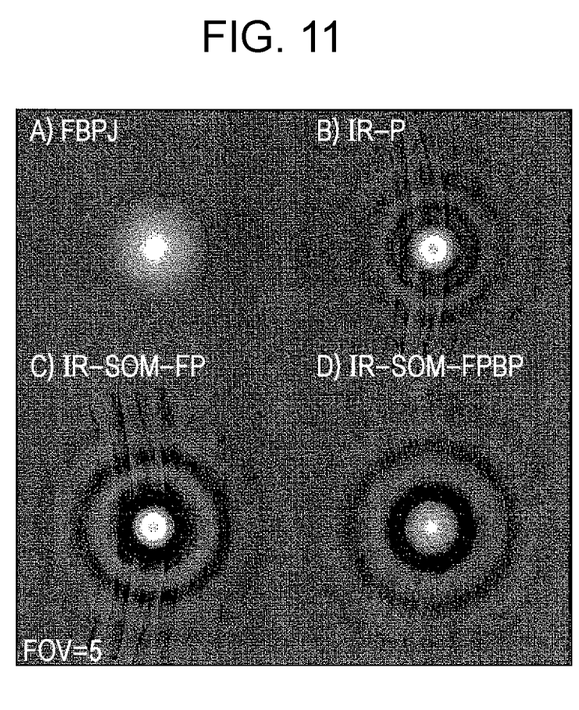
FIG. 11 are iteratively reconstructed images including the full system optics are shown for a comparison under predetermined conditions according to the current invention.

Now referring to FIG. 11, iteratively reconstructed images including the full system optics are shown for a comparison under predetermined conditions according to the current invention. The reconstructed images are of the 1.1 mm source and the 0.2 bead. A FBPJ and IR combination reconstructed and normalized images. Clearly IR-SOM-FPBP has the best resolution; with a FWHM of 0.48 mm. This is almost half that of FBPJ (0.87 mm), and considerably better than IR-P (0.63 mm) and IR-SOM-FP (0.59 mm). As with the exaggerated source simulations, IR-SOM-FPBP exhibits sidelobes. Additionally, the IR-P and IR-SOM-FP reconstructions exhibit a "dimple" in the middle of the bead; whereas the IR-SOM-FPBP does not. The effect of increasing the number of iterations to 10,000 for IR-SOM-FPBP was also investigated, with the result that the FWHM resolution further improved to 0.41 mm, with the sidelobe level remaining approximately constant.

Figure 12:
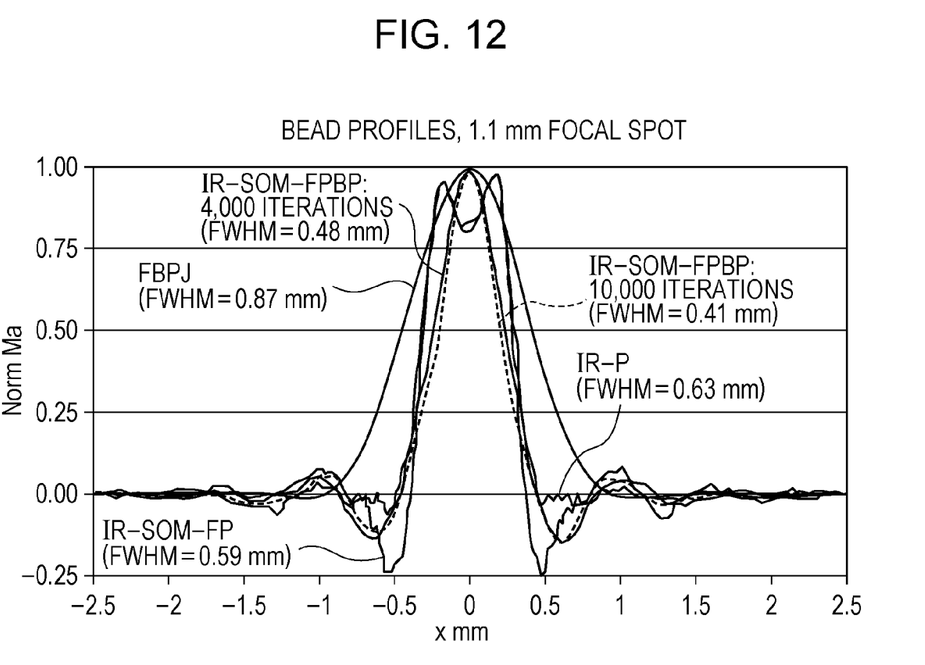
FIG. 12 is a graph illustrating 1-D profiles along x axis through the 0.2 mm bead after 4,000 iterations under the above described four conditions according to the current invention.

FIG. 12 is a graph illustrating 1-D profiles along x axis through the 0.2 mm bead after 4,000 iterations under the above described four conditions according to the current invention. As described above with respect to FIG. 11, the profile under the conditions of IR-SOM-FPBP has a substantially better resolution than reconstructed images under the conditions of the filtered backprojection (FBPJ), "pencil beam" IR with no system model (IR-P), and IR with system model only in forward projection. The profile under the conditions of IR-SOM-FPBP after 10,000 iterations is plotted using a dotted line.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of reconstructing an image using a scanner, comprising:
    acquiring data for an object;
    estimating an image based upon the data;
    iteratively performing steps of:
        forward projecting to generate projection data using a first predetermined one of system optics models and non-system optics models, wherein the system optics models include at least a voxel model, a focal spot model, a detector element model and a rotation blur model; and
        back projecting to update an image using a second predetermined one of the system optics models.

2. The method of reconstructing an image according to claim 1 wherein the first predetermined one of the system optics models is the same as the second predetermined one of the system optics models.

3. The method of reconstructing an image according to claim 1 wherein the first predetermined one of the system optics models is different from the second predetermined one of the system optics models.

4. The method of reconstructing an image according to claim 1 wherein at least one of the system optics models utilizes microrays.

5. The method of reconstructing an image according to claim 4 wherein the microrays are projected in parallel.

6. The method of reconstructing an image according to claim 4 wherein the microrays are projected in cone.

7. The method of reconstructing an image according to claim 4 wherein a source geometry is sampled at a predetermined first number of discrete micro source points, each of the microsource points being weighted by a corresponding one of source response weights.

8. The method of reconstructing an image according to claim 7 wherein a detector geometry is sampled at a predetermined second number of discrete micro detector points, each of the micro detector points being weighted by a corresponding one of detector response weights.

9. The method of reconstructing an image according to claim 8 wherein a voxel geometry is sampled at a predetermined third number of discrete micro voxel points, each of the micro voxel points being weighted by a corresponding one of voxel response weights.

10. A system for reconstructing an image using a scanner, comprising:
a scanner for acquiring data for an object;
an image processing circuit connected to said scanner for estimating an image based upon the data; and
an image reconstruction circuit connected to said image processor for iteratively performing forward projection to generate projection data using a first predetermined one of system optics models and non-system optics models and back projection to update an image using a second predetermined one of the system optics models, wherein the system optics models include at least a voxel model, a focal spot model, a detector element model and a rotation blur morel.

11. The system for reconstructing an image according to claim 10 wherein the first predetermined one of the system optics models is the same as the second predetermined one of the system optics models.

12. The system for reconstructing an image according to claim 10 wherein the first predetermined one of the system optics models is different from the second predetermined one of the system optics models.

13. The system for reconstructing an image according to claim 10 wherein at least one of the system optics models utilizes microrays.

14. The system for reconstructing an image according to claim 13 wherein the microrays are projected in parallel.

15. The system for reconstructing an image according to claim 13 wherein the microrays are projected in cone.

16. The system for reconstructing an image according to claim 13 wherein a source geometry is sampled at a predetermined first number of discrete micro source points, each of the microsource points being weighted by a corresponding one of source response weights.

17. The system for reconstructing an image according to claim 16 wherein a detector geometry is sampled at a predetermined second number of discrete micro detector points, each of the micro detector points being weighted by a corresponding one of detector response weights.

18. The system for reconstructing an image according to claim 17 wherein a voxel geometry is sampled at a predetermined third number of discrete micro voxel points, each of the micro voxel points being weighted by a corresponding one of voxel response weights.

* * * * *